US012652461B2

(12) United States Patent　　　　(10) Patent No.:　US 12,652,461 B2
　　Gupta et al.　　　　　　　　　　(45) Date of Patent:　　Jun. 9, 2026

(54) ENABLING AND DISABLING AN ALWAYS ON CAMERA IN AN ELECTRONIC DEVICE

(71) Applicant: MOTOROLA MOBILITY LLC, Wilmington, DE (US)

(72) Inventors: Ranjeet Gupta, Aurora, IL (US); Rahul Bharat Desai, Hoffman Estates, IL (US)

(73) Assignee: Motorola Mobility LLC, Chicago, IL (US)

( * ) Notice: Subject to any disclaimer, the term of this patent is extended or adjusted under 35 U.S.C. 154(b) by 13 days.

(21) Appl. No.: 18/951,351

(22) Filed: Nov. 18, 2024

(65) Prior Publication Data

US 2026/0143224 A1　　May 21, 2026

(51) Int. Cl.
　　*H04N 23/65*　　　　(2023.01)
　　*H04N 23/63*　　　　(2023.01)

(52) U.S. Cl.
　　CPC ......... *H04N 23/651* (2023.01); *H04N 23/632* (2023.01)

(58) Field of Classification Search
　　CPC ...... H04N 23/651; H04N 23/632; G09G 3/20; G06F 1/3203; G06F 1/3265; G06F 1/3228; G06F 1/3231
　　See application file for complete search history.

(56) References Cited

U.S. PATENT DOCUMENTS

| | | | | |
|---|---|---|---|---|
| 2004/0073827 | A1* | 4/2004 | Tsirkel | G09G 3/20 |
| | | | | 713/323 |
| 2009/0055670 | A1* | 2/2009 | Yamamoto | H04N 23/667 |
| | | | | 713/323 |
| 2009/0058791 | A1* | 3/2009 | Lee | H04N 5/144 |
| | | | | 345/102 |
| 2014/0208145 | A1* | 7/2014 | Piccolotto | G09G 3/20 |
| | | | | 713/324 |
| 2014/0267799 | A1 | 9/2014 | Sadasivam | |
| 2016/0269634 | A1 | 9/2016 | Xu et al. | |
| 2019/0025780 | A1 | 1/2019 | Dittmann | |
| 2022/0091658 | A1* | 3/2022 | Hayashi | G06F 1/3237 |
| 2024/0223733 | A1* | 7/2024 | Lu | H04N 23/661 |

FOREIGN PATENT DOCUMENTS

| | | |
|---|---|---|
| CN | 109639980 A | 4/2019 |

OTHER PUBLICATIONS

International Search Report and Written Opinion, International Application No. PCT/US2025/022092, Jun. 6, 2025.

\* cited by examiner

*Primary Examiner* — Nhan T Tran

(74) *Attorney, Agent, or Firm* — Isidore PLLC

(57)　　　　　ABSTRACT

An electronic device, a method and a computer program product provide techniques for reducing power consumption of an always on camera (AoC) when the device is operating in an AoC mode. The method includes initiating a timer tracking a time period from the activation of an AoC mode. The method includes capturing a first image preview and monitoring for movement of the device indicative of a change in at least one of a position or an orientation of the electronic device. The method includes, in response to expiration of the time period, without detecting movement of the electronic device, capturing a second image preview using the camera and determining if the second image preview is similar to the first image preview. In response to the first image preview being similar to the second image preview, the method includes modifying the AoC mode to reduce power usage by the camera.

20 Claims, 8 Drawing Sheets

Figure 2:
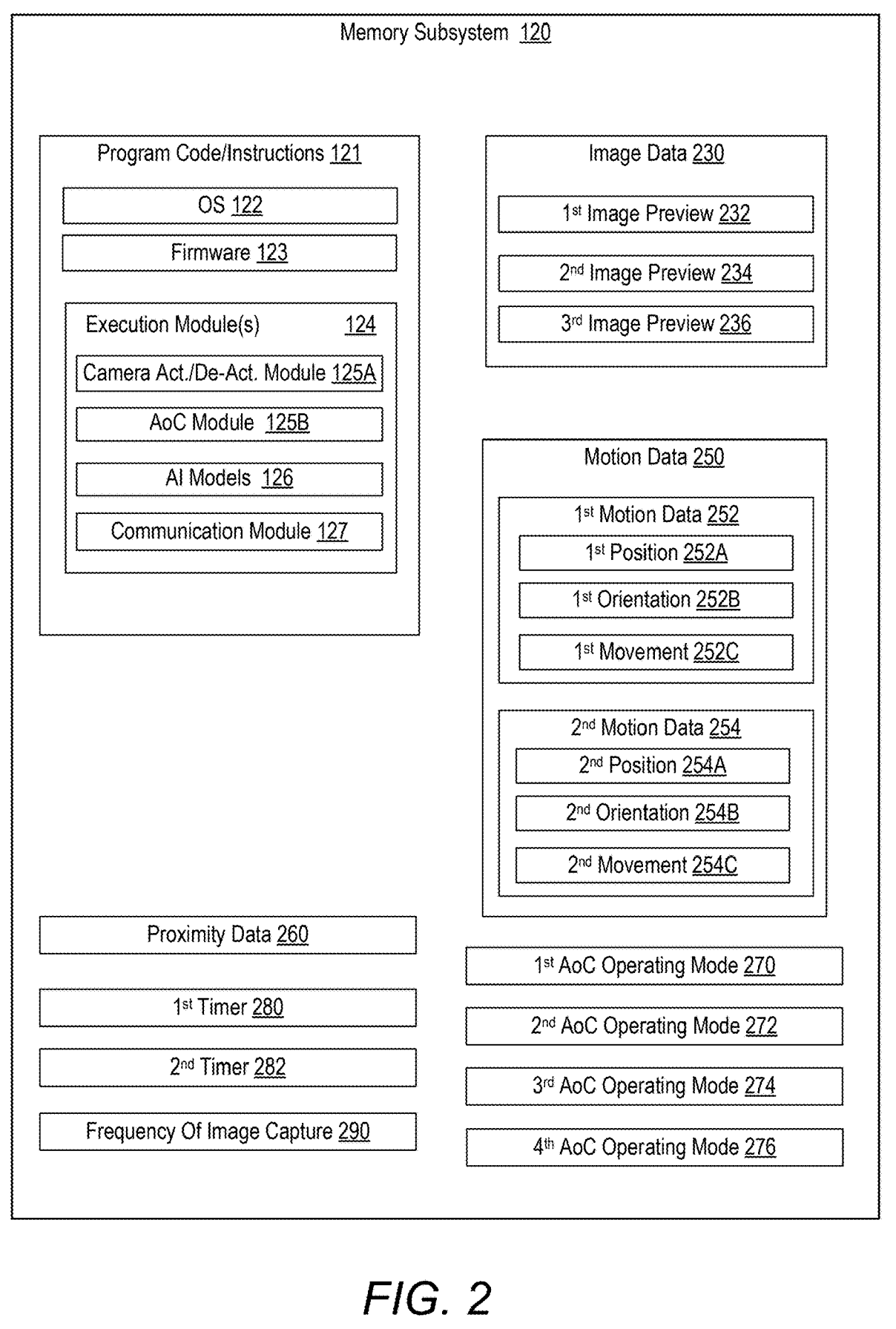

Memory Subsystem 120

Program Code/Instructions 121

OS 122

Firmware 123

Execution Module(s) 124

Camera Act./De-Act. Module 125A

AoC Module 125B

AI Models 126

Communication Module 127

Image Data 230

1st Image Preview 232

2nd Image Preview 234

3rd Image Preview 236

Motion Data 250

1st Motion Data 252

1st Position 252A

1st Orientation 252B

1st Movement 252C

2nd Motion Data 254

2nd Position 254A

2nd Orientation 254B

2nd Movement 254C

Proximity Data 260

1st Timer 280

2nd Timer 282

Frequency Of Image Capture 290

1st AoC Operating Mode 270

2nd AoC Operating Mode 272

3rd AoC Operating Mode 274

4th AoC Operating Mode 276

ENABLING AND DISABLING AN ALWAYS ON CAMERA IN AN ELECTRONIC DEVICE

BACKGROUND

1. Technical Field

The present disclosure generally relates to electronic devices and in particular to an electronic device having an always on camera.

2. Description of the Related Art

Electronic devices, such as mobile phones, tablets, and laptops, are widely used for video, voice, and text communication and for data transmission. Many conventional electronic devices have at least one front facing camera and one or more rear facing cameras. Electronic devices with cameras can be used to capture various images within a field of view of the camera. An electronic device user can choose to capture an image of friends, objects, scenery, or themselves.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 2 is a block diagram of example contents of the memory subsystem of the example electronic device of FIG. 1A-1B (FIG. 1), which configures the electronic device to complete the various processes described herein, according to one or more embodiments;

FIG. 3C illustrates another example illustration of an electronic device being held by a user in a second position, having an always on camera (AoC) and operating in a first AoC operating mode, according to one or more embodiments;

FIG. 3D is an example image preview captured by the front camera of the electronic device in the second position of FIG. 3C, according to one or more embodiments;

DETAILED DESCRIPTION

Figure 1A:
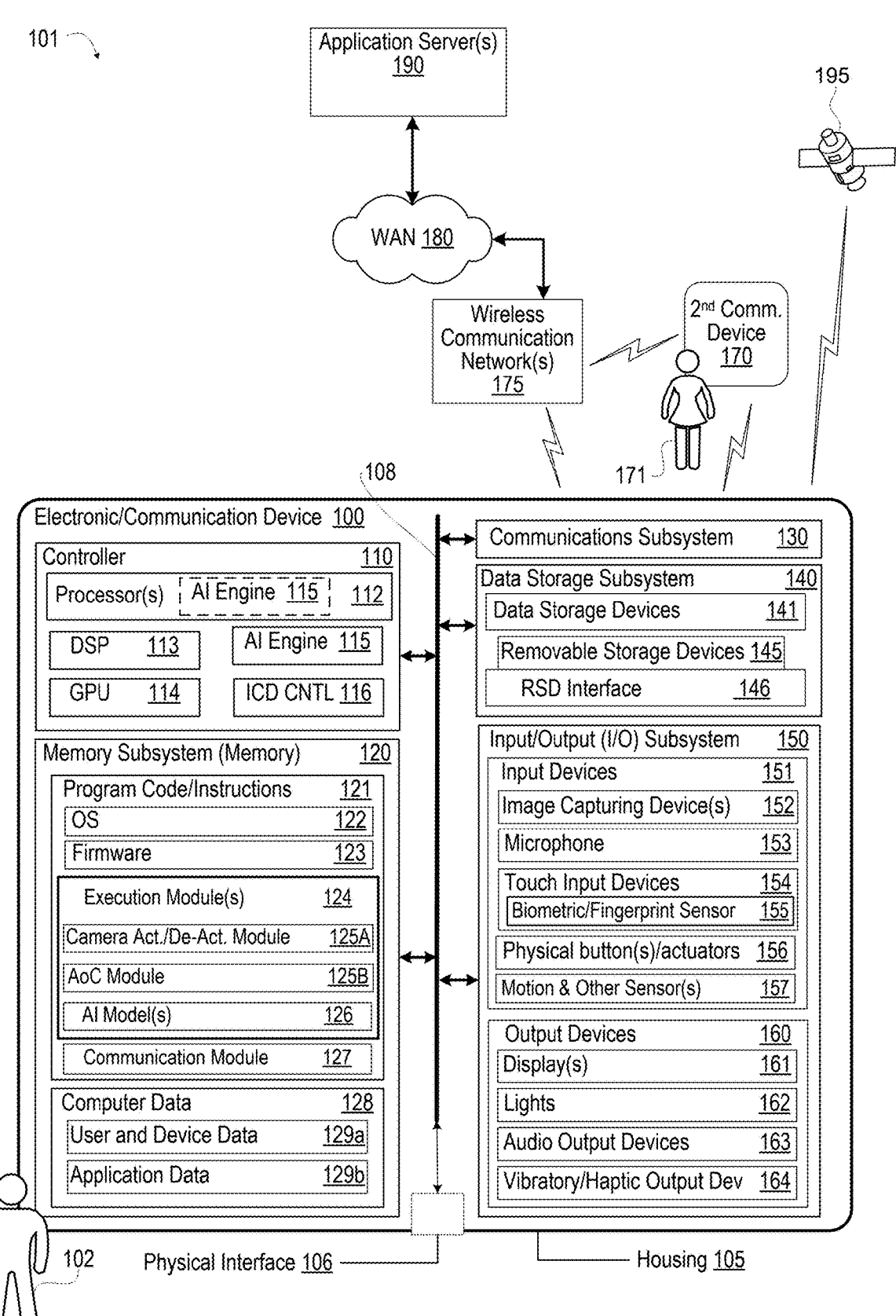
FIG. 1A presents a functional block diagram of example components of an electronic device in a communication environment and having hardware and software components that enable the features of the present disclosure to be advantageously implemented, according to one or more embodiments.

According to one or more aspects of the disclosure, the illustrative embodiments provide an electronic device, a method, and a computer program product for activating and de-activating at least one always-on camera while operating in an always on camera (AoC) mode in order to reduce power consumption. An electronic device with an always on camera (AoC) modifies a frequency of image capture by an AoC based on an amount of detected movement of the electronic device or detected changes in captured images during a sampling interval. The electronic device may also turn off the AoC altogether if no movement or change in captured preview image is detected over the sampling interval.

An always-on-camera (AoC) mode is an operating feature found in some electronic devices that have integrated cameras. For example, a smart home device such a smart security camera can have an AoC and operate in an AoC mode. An electronic device such as smartphone can also have an AoC. The term AoC generally refers to the capability of a camera to be constantly active, monitoring or capturing an image stream or video even when the camera is not in active use by a user of the electronic device. An electronic device having an AoC can provide constant monitoring and motion detection within a captured image stream. An electronic device having an AoC can provide surveillance of an area within a field of view of the AoC.

Operating in an AoC mode can impact (i.e., reduce) the life of the battery of the electronic device. An AoC may typically have a low rate of power consumption; however, because the AoC is constantly active, the AoC is consuming power from the battery all the time and, as such, the AoC does impact the battery life of the electronic device. There are various situations where an AoC does not need to be active. In one example, an AoC does not need to active when a user is at sleep. In another example, an AoC does not need to active when the electronic device is in a pocket or purse. However, conventional systems maintain the AoC in a low power consuming AoC mode, causing a drain on the device battery, even in these situations.

The embodiments disclosed herein addresses and overcome the aforementioned problems of an electronic device with an AoC consuming battery power even when the AoC is not being used. One or more aspects of the embodiments disclosed herein enable an AoC of an electronic device to be de-activated when images captured by the AoC over a certain time span do not change. Another aspect of the embodiments disclosed herein further enable an AoC of an electronic device to be de-activated when the electronic device is stationary (i.e., movement of the electronic device is not detected) over a period of time. Yet another aspect of the embodiments disclosed herein enable an AoC of an electronic device to reduce a frequency of image capture in situations when changes in movement within the image or movement of the device are not detected. The embodiments disclosed herein enable an electronic device to reduce power consumption and increase battery life.

In a first embodiment, an electronic device includes at least one camera that is utilized to support always-on-camera (AoC) functionality of the electronic device, at least one sensor that detects movement of the electronic device, and a memory having stored thereon an AoC module and a camera activation/de-activation module for activating and de-activating the at least one camera. The electronic device includes at least one processor that is communicatively coupled to each of the at least one camera, the at least one sensor, and the memory, and which executes program code of the AoC module and the camera activation/de-activation module. The at least one processor is configured to cause the electronic device to, in response to detecting an always on camera (AoC) operating mode of the electronic device: initiate a first timer tracking a first time period from the detection of the AoC operating mode of the electronic device; and capture a first image preview via the at least one camera. The at least one processor monitors, via the at least one sensor during the first time period, for movement of the electronic device indicative of a change in at least one of a position or an orientation of the electronic device. In response to expiration of the first time period, without detecting movement of the electronic device, the at least one processor captures a second image preview using the at least one camera and determines if the second image preview is substantially similar to the first image preview. In response to the first image preview being substantially similar to the second image preview, the at least one processor modifies the AoC operating mode to reduce power usage by the at least one camera.

According to another embodiment, the method includes, in response to an detecting an always on camera (AoC) operating mode of an electronic device, initiating, via at least one processor, a first timer tracking a first time period from the detection of the AoC operating mode of the electronic device. The method includes capturing a first image preview via at least one camera and monitoring, via at least one sensor during the first time period, for movement of the electronic device indicative of a change in at least one of a position or an orientation of the electronic device. The method includes, in response to expiration of the first time period, without detecting movement of the electronic device, capturing a second image preview using the at least one camera and determining if the second image preview is substantially similar to the first image preview. In response to the first image preview being substantially similar to the second image preview, the method includes modifying the AoC operating mode to reduce power usage by the at least one camera.

According to an additional embodiment, a computer program product includes a computer readable storage device having stored thereon program code that, when executed by at least one processor of an electronic device having at least one camera and at least one sensor, the program code enables the electronic device to complete the functionality of the above-described method processes.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent within the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within electronic device 100 (FIG. 1A-1B) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural, functional, operational, or otherwise) on the described embodiments.

Referring now to the figures and beginning with FIG. 1A, there is illustrated a block diagram of an example electronic device 100 in a communication environment 101 and having hardware and software components, which enable the features of the present disclosure to be advantageously implemented, according to one or more embodiments. Examples of electronic device 100 can include, but are not limited to, a mobile devices, a notebook computer, a mobile phone, a smart phone, a digital camera with enhanced processing capabilities, a smart watch, a tablet computer, and other types of electronic devices.

Electronic device 100 generally includes controller 110, memory (or memory subsystem) 120, communication subsystem 130, data storage subsystem 140, input/output subsystem 150, all contained within or extended from an exterior surface of device housing 105. Controller 110 is shown communicatively connected/coupled via system interlink 108 with each of the subsystems 120, 130, 140, and 150, and is directly or indirectly connected with the individual components within each subsystem 120, 130, 140, and 150. System interlink 108 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components.

Controller 110 includes processor 112, which includes one or more central processing units (CPUs) or data processors. Processor 112 performs many of the features of controller 110 and references to features performed by controller 110 can be interchangeably referred to herein as features of processor 112, and vice-versa. In some embodiments, the various functions associated with controller 110 are integrated into processor 112, and accordingly, references made herein to controller and/or processor are understood to refer to one or both components as providing a single management component within the electronic device 100. For simplicity in describing the features of the electronic device 100, the operational functions provided by one or more of operational components within controller 110, including those provided by processor 112 are collectively described as being performed by controller 110. Collectively, components integrated within controller 110 support computing, classifying, processing, transmitting and receiving of data and information, and presenting of graphical and photographic images within a display.

As illustrated, controller 110 can also include one or more digital signal processors 113, graphics processing units (GPUs) 114, artificial intelligence (AI) engine 115, and image capturing device (ICD) controller 116. In some embodiments, the functionality of each of these additional processing components can be integrated with processor(s) 112. For example, processor 112 can, in some embodiments, include dedicated AI engine 115 and image signal processors (ISPs) (not shown).

Controller 110 manages, and in some instances directly controls, the various functions and/or operations of communication device 100. These functions and/or operations include, but are not limited to including, application data processing, communication, location and navigation tasks, image processing, and signal processing. In one or more alternate embodiments, electronic device 100 may use hardware component equivalents for application data processing and signal processing. For example, electronic device 100 may use special purpose hardware, dedicated processors, general purpose computers, microprocessor-based computers, micro-controllers, optical computers, analog computers, dedicated processors and/or dedicated hard-wired logic. Controller 110 can, in some embodiments, also include a hardware acceleration (HA) unit, which can establish direct memory access (DMA) sessions to route network traffic to various elements within electronic device 100 without direct involvement from processor 112 and/or a device operating system 122.

Memory subsystem (or memory) 120 may include a combination of volatile and non-volatile memory, such as random-access memory (RAM) and read-only memory (ROM). Memory subsystem 120 stores program code/instructions 121 for execution by processor 112 to configure processor 112 (and more generally electronic device 100) to provide the operational functions and features described herein. Program code/instructions 121 (or program code 121 for short) include instructions for an operating system (OS) 122, firmware 123, such as basic input/output system (BIOS) or Uniform Extensible Firmware Interface (UEFI). Program code 121 includes execution module(s) 124 that collectively provides the various features of the disclosure.

Execution module(s) 124 include, without limitation, camera activation/de-activation module 125A, and AoC module 125B. Camera activation/de-activation module 125A provides the features and operating functionality of the disclosed embodiments when the corresponding program instructions of camera activation/de-activation module 125A are processed by/within processor 112/controller 110. Specifically, camera activation/de-activation module 125A provides program instructions for activating/enabling and de-activating/disabling at least one camera that is operating in an AoC mode. AoC module 125B provides program instructions for operating at least one camera in an AoC mode.

Execution modules 124 further includes AI model(s) 126. In one or more embodiments, processor 112 can utilize AI models 126 to provide AI functionality of processor-integrated AI engines 115. In other embodiments, AI models 126 are directly utilized by AI engine 115. In one or more embodiments, AI model 126 is integrated as a sub-module within camera activation/de-activation module 125A and is trained to support the AI features of camera activation/de-activation module 125A. AI model(s) 126 may include an artificial neural network, a decision tree, a support vector machine, Hidden Markov model, linear regression, logistic regression, Bayesian networks, and so forth. AI model(s) 126 can be individually trained to perform specific tasks and can be arranged in different sets of AI models to generate different types of output. Training of AI model(s) 126 is the process by which AI models are trained to perform specific tasks or achieve certain objectives. The training involves providing the model with a large amount of data and allowing the model to learn from patterns and relationships within that data.

Each of the above-introduced module(s) and/or application(s) provides program instructions/code that are processed by processor 112 and which configures processor 112 (and/or controller 110) and/or other operational components of electronic device 100 to cause the electronic device 100 to perform specific operations and functions, as described herein. Descriptive names assigned to these modules add no functionality and are provided solely to assist in identify the underlying features performed by processing the different modules. For example, camera activation/de-activation module 125A can include program instructions that cause or configure processor 112 to cause electronic device 100 to activate/enable and/or de-activate/disable one or more cameras of the electronic device. Other features provided by camera activation/de-activation module 125A are described in further detail throughout this disclosure.

Program code 121 can further include instructions/code for other applications (not shown) providing different features of/within electronic device 100. In one or more embodiments, program code 121 may be integrated into a distinct chipset or hardware module as firmware that operates separately from other executable program code. Portions of program code 121 may be incorporated into different hardware components that operate in a distributed or collaborative manner.

Memory subsystem 120 also includes computer data 128. During execution of program code 121, processor 112 may access, use, generate, modify, store, or communicate computer data 128, such as user and device data 129a and application data 129b. Computer data 128 may incorporate "data" that originated as raw, real-world "analog" information that consists of basic facts and figures. Computer data 128 includes different forms of data, such as numerical data, images, coding, notes, and financial data, as well as data presenting video, graphics, text, and images. Computer data 128 may originate at electronic device 100 or may be retrieved from a remote device via communications subsystem 130. Electronic device 100 may store, modify, present, or transmit computer data 128.

Communications subsystem 130 includes various components that enable electronic device 100 to communicate with external communication networks and other devices, such as second electronic device 170 and application server(s) 190, etc., via communications subsystem 130. According to one or more embodiments, communication module 127 presented within program code 121 includes instructions supporting the use of communications subsystem 130 to establish communication interfaces enabling communication by electronic device 100 with these external networks and devices.

Data storage subsystem 140 of electronic device 100 includes data storage device(s) 141. Controller 110 is communicatively connected, via system interlink 108, to data storage device(s) 141. Data storage subsystem 140 provides stored versions of program code 121 and computer data 128 on nonvolatile storage that is accessible by controller 110. The program code 121 can be loaded into memory 120 for execution/processing by controller 110. In one or more embodiments, data storage device(s) 141 can include hard disk drives (HDDs), optical disk drives, and/or solid-state drives (SSDs), etc.

Data storage subsystem 140 of communication device 100 can include removable storage device(s) (RSD(s)) 145, which is received in RSD interface 146. Controller 110 is communicatively connected to RSD 145, via system interlink 108 through RSD interface 146. In one or more embodiments, RSD 145 is a non-transitory computer program product or computer readable storage device that stores program code and associated data, including a copy of camera activation/de-activation module 125A and AI model(s) 126, which may be executed by a processor associated with a user device, such as electronic device 100. Controller 110 can access data storage device(s) 141 or RSD(s) 145 to provision electronic device 100 with stored program code 121 and computer data 128 that, when executed/processed by processor 112, the program code configures processor 112 and/or more generally electronic device 100, to provide the various functions described herein.

I/O subsystem 150 includes input devices 151 such as, but not limited to, image capturing device(s) (ICDs) 152, microphone 153, and touch input devices 154 (e.g., touch screens, keys, or buttons) for use by user 102 to interface with electronic device 100. Touch input devices 154 can include a biometric/fingerprint sensor 155 for biometric input. Biometric/fingerprint sensor 155 can be used to read/receive biometric data, such as fingerprints, to identify or authenticate a user. In some embodiments, the biometric sensor 155 can supplement an ICD (camera), which captures images for user detection/identification via facial recognition.

Input devices 151 may include physical buttons/actuators 156 that can be located on a periphery of the device housing 105. Physical buttons 156 may provide controls for volume, power, and ICDs 152. Microphone 153 can also be referred to as an audio input device. In some embodiments, microphone 153 may be used for identifying a user via voiceprint, voice recognition, and/or other suitable techniques. Input devices 151 can also include one or more motion or other sensor(s) 157, which are further defined in the FIG. 1B description which follows.

Figure 1B:
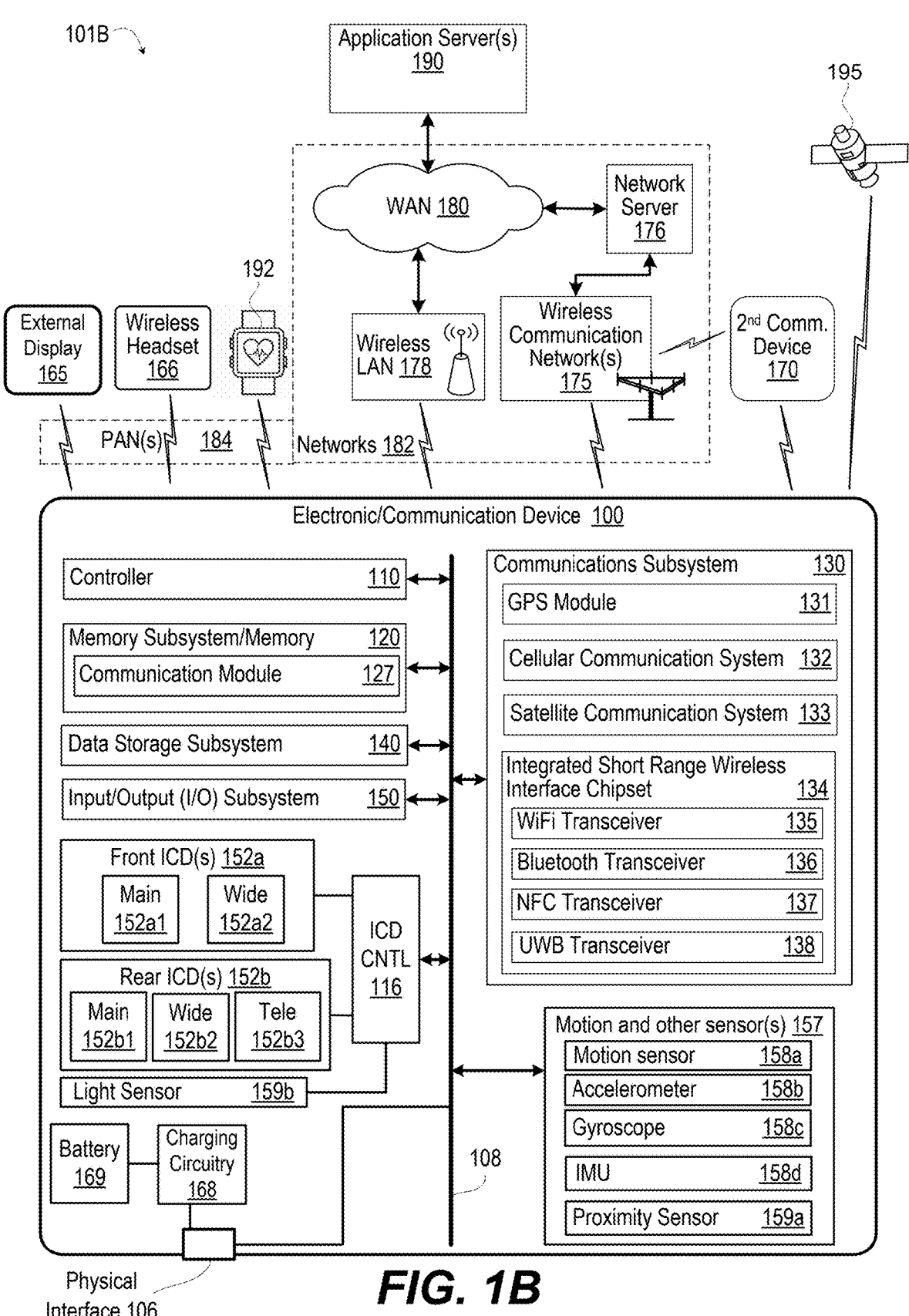
FIG. 1B is an additional block diagram representation of the electronic device of FIG. 1A presenting additional components, including components for wireless communications with other devices and several image capturing devices, according to one or more embodiments.

With reference to FIG. 1B, as illustrated, motion and other sensor(s) 157 of electronic device 100 include, but are not limited to, one or more motion sensor(s) 158a, one or more accelerometers 158b, one or more gyroscopes 158c, inertial measurement unit (IMU) 158d, and proximity sensor 159a, etc. Motion sensor(s) 158a detect movement of electronic device 100 and provide motion data to processor 112 indicating the spatial orientation, position and movement of electronic device 100. Accelerometers 158b measure linear acceleration of movement of electronic device 100 in multiple axes (X, Y and Z). For example, accelerometers 158b can include three accelerometers, where one accelerometer measures linear acceleration in the X axis, one accelerometer measures linear acceleration in the Y axis, and one accelerometer measures linear acceleration in the Z axis. Accelerometers 158b can be used to calculate the orientation/position of electronic device 100 relative to the earth and can also be referred to as a gravity sensor. Gyroscope 158c measures rotation or angular rotational velocity of electronic device 100. IMU 158d measures force, angular rate, and orientation of electronic device 100, using a combination of accelerometers, gyroscopes, and magnetometers.

Proximity sensor 159a senses the presence of nearby objects. In one embodiment, proximity sensor 159a can be an infrared (IR) sensor that detects the presence of a nearby object, such as when electronic device 100 is in a pocket of a user. Electronic device 100 can also include one or more light sensors 159*b*, which detects the luminance and/or intensity (i.e., the amount) of ambient light surrounding the electronic device 100.

Referring again to FIG. 1A, I/O subsystem 150 includes output devices 160 such as, but not limited to, display(s) 161, lights 162, audio output devices 163, and vibratory and/or haptic output devices 164. In one or more embodiments, electronic device 100 includes an integrated display 161 which incorporates a tactile, touch screen interface that can receive user's tactile/touch input. As a touch screen device, integrated display 161 allows a user to provide input to and/or to control electronic device 100 by touching features within a user interface presented on integrated display 161. Tactile, touch screen interface (154) can be utilized as an input device. The touch screen interface 154 can include one or more virtual buttons or selectable affordances. In one or more embodiments, when a user applies a finger or stylus on the touch screen interface (154) in the region demarked by the virtual button, the touch of the region causes the processor 112 to execute code to implement a function associated with the virtual button. In some implementations, integrated display 161 is integrated into a front surface of electronic device housing 105 along with front image capturing devices (not specifically shown), while the higher quality ICDs are located on a rear surface of housing 105. Other embodiments provide for multiple integrated displays within electronic device 100 and references to display(s) 161 are assumed to refer to one or all of these multiple integrated displays.

Vibration/haptic output device 164 can cause electronic device 100 to vibrate or shake when activated. Vibration device 164 can be activated during an incoming call or message in order to provide an alert or notification to a user of electronic device 100. Audio output devices (e.g., a speaker) 163 can provide an audio alert or other audio output to a user. In one or more embodiments, integrated display 161, audio output devices (or speakers) 163, and vibration/haptic device 164 can generally and collectively be referred to as output devices.

With reference now to FIG. 1B and with continuing reference to FIG. 1A, there is presented another view of electronic device 100 with components enabling electronic device 100 to function as a mobile communication device, within an expanded communication environment 101B. In addition to the functional and operational components already presented by and described within the description of FIG. 1A, FIG. 1B further illustrates expanded communications subsystem 130 with additional communication components and interfaces enabling electronic device 100 to perform wireless communications within an expanded communication environment 101B that includes other devices.

Communications subsystem 130 includes global positioning system (GPS) module 131 that enables electronic device to communicate with and receive GPS location data from GPS satellite(s) 195. In one or more embodiments, GPS module 131 receives geospatial input from GPS broadcasts of time data and location data from GPS satellite(s) 195 to obtain geospatial location information about the physical location of electronic device 100.

In one or more embodiments, controller 110, via communications subsystem 130, performs multiple types of cellular over-the-air (OTA) or non-cellular wireless communication, such as by using a Bluetooth connection or other personal access network (PAN) connection. As shown, communications subsystem includes cellular communication system

132, which includes at least one radio frequency RF front end coupled to one or more antennas. In one or more embodiments, cellular communication system 132 can include a communication module with one or more baseband processors or digital signal processors, one or more modems, and a radio frequency (RF) front end having one or more transmitters and one or more receivers. In one or more embodiments, controller 110, via communications subsystem 130, may communicate via an OTA cellular connection with radio access networks (RANs) over a cellular wireless communication network (CWCN) 175. CWCN 175 can be a terrestrial network and include a plurality of base stations and associated network server(s) 176, in one embodiment. Cellular communication system 132 allows electronic device 100 to communicate wirelessly with CWCN 175 via transmissions of communication signals (represented as lightning bolts) to and from network communication devices, such as base stations or cellular nodes, of CWCN 175. Alternatively, or in addition, CWCN 175 can include a satellite network, and electronic device 100 connects to CWCN 175 using satellite communication system 133. Cellular communication system 132 and satellite communication system 133 enable electronic device 100 to engage in long distance wireless communication capabilities.

In one or more embodiments, communications subsystem 130 includes integrated short range wireless interface chipset 134 having one or more of Wi-Fi transceiver (TxRX) 135, Bluetooth (BT) TxRx 136, near field communication (NFC) transceiver 137, and ultra-wideband (UWB) transceiver 138. In one or more embodiments, the short-range communication devices are not integrated on a single chipset, but can be separately provided hardware components. In one or more embodiments, electronic device 100 can communicate wirelessly with external wireless devices, such as a WiFi router of a wireless local area network (WLAN) 178 and/or second electronic device 170, via one or more short-range wireless interface(s). Second electronic device 170 can be a communication device, such as a smartphone that is used by a second user 171, and/or can be similarly configured as electronic device 100. In one or more embodiments, electronic device 100 can receive Internet or Wi-Fi based calls, text messages, multimedia messages, and other notifications via a combination of wireless and wired networks (generally networks 182).

In one or more embodiments, networks 182 can include CWCN 175, WLAN 178, and Wide Area Network (WAN) 180, such as the Internet. In one or more embodiments, WAN 180 can enable electronic device 100 to access application servers 190, which can provide a downloadable version of camera activation/de-activation module 125A and/or access to other applications, online transactions, and resources. In one or more embodiments, networks 182 can also include personal area networks (PAN) 184, which are individually created with second devices via one of short-range wireless devices from among Wi-Fi TxRX 135, BT TxRx 136, NFC transceiver 137, and UWB transceiver 138. Example second devices include external display 165, wireless headset 166, and wearable computing device 192. External display 165 can be a stand-alone monitor/display or a display integrated into a second electronic device, such as a laptop computer. In at least one embodiment, connection to the external display 165 can be wired and can include an intermediate connection device, such as a docking station device. In one or more embodiments, wearable computing device 192, such as a smartwatch, fitness tracker, or the like, may be paired with electronic device 100, and provide biometric data such as heart rate, breathing rate, and the like, to the electronic device 100 via the paired communication link.

Electronic device 100 also includes a physical interface 106. Physical interface 106 of electronic device 100 can serve as a data port and can also be used as a power supply port that is coupled to charging circuitry 168, which feeds electrical power to device battery 169 to enable recharging of device battery 169 and/or powering of electronic device 100. As a data port, physical interface 106 can enable electronic device 100 to be physically coupled via a cable or docking station port to a second device, such as external display 165.

FIG. 1B presents additional details of ICD(s) 152 of electronic device 100. Throughout the disclosure, the term image capturing device (ICD) is synonymous with and/or utilized interchangeably with any one of the cameras of electronic device 100. ICD(s) (or cameras) 152 include front cameras 152a and rear cameras 152b. In one embodiment, each of front cameras 152a and rear cameras 152b are communicatively coupled to ICD controller 116. ICD controller 116 supports the processing of image data from front cameras 152a and rear cameras 152b. Front cameras 152a can include a main camera 152a1 and a wide angle camera 152a2. Rear cameras can include a main camera 152b1, a wide angle camera 152b2, and a telephoto camera 152b3. Both sets of cameras 152 include image sensors that can capture images that are within the field of view (FOV) of each respective camera 152. In one or more embodiments, one or more of the cameras can be utilized to enable biometric authentication using facial image or iris scan recognition.

In one embodiment, main cameras 152a1 and 152b1 can be low resolution (i.e., a low number of pixels) always on cameras (AoC) that continuously capture images and have a low level of power consumption. Wide angle cameras 152b2, 152b2, and telephoto camera 152b3 can be high resolution cameras (i.e., a high number of pixels) that only capture images when triggered and have a higher level of power consumption.

In the description of each of the following figures, reference is also made to specific components illustrated within the preceding figure(s). Similar or same components are presented with the same leading reference number.

Referring to FIG. 2, there is shown one embodiment of example contents of memory subsystem 120 of electronic device 100. In the described embodiments, the contents of the memory are utilized to and/or configure electronic device 100 to complete the various processes described herein. Memory subsystem 120 includes program code/instructions 121 including data, software, and/or firmware modules, such as operating system (OS) 122, firmware 123, and execution module(s) 124. Execution module(s) 124 include camera activation/de-activation module 125A, AoC module 125B, AI models 126, and communication module 127.

Camera activation/de-activation module 125A includes program code that is executed by processor 112 to enable electronic device 100 to perform the various features of the present disclosure. In one or more embodiments, camera activation/de-activation module 125A enables electronic device 100 to enable and disable one or more cameras of the electronic device including one or more AoC(s). AoC module 125B enables electronic device 100 to operate in an AoC mode and capture images using an AoC.

In one or more embodiments, execution of camera activation/de-activation module 125A and AoC module 125B by processor 112 configures electronic device 100 to perform the processes presented in the flowcharts of FIGS. 5-6, as will be described below. AI models 126 accelerate artificial intelligence, natural language processing (NLP), context evaluation (CE), and machine learning applications. Communication module 127 enables electronic device 100 to communicate and exchange data with other devices via networks 182.

Memory subsystem 120 includes image data 230. Image data 230 can be captured by one or more cameras 152 of electronic device 100. Image data 230 includes first image preview 232, second image preview 234, and third image preview 236. In one embodiment, first image preview 232, second image preview 234, and third image preview 236 are captured by one or more cameras 152 of electronic device 100 that are operating in an AoC mode that continuously (or on a preset periodic schedule) capture one or more image preview(s) and/or images. In one embodiment, first image preview 232, second image preview 234, and third image preview 236 can comprise multiple images that are captured over a period of time.

Memory subsystem 120 includes motion data 250. Motion data can be sensed and/or detected by one or more motion sensors (157) of electronic device 100. Motion data 250 includes first motion data 252 and second motion data 254. Motion data 250 indicates the spatial orientation, position and movement of electronic device 100. First motion data 252 includes first position 252A, first orientation 252B and first movement 252C at a first time. First position 252A corresponds to a first position/location of electronic device 100. First orientation 252B corresponds to a first orientation of electronic device 100 relative to the earth. First movement 252C corresponds to a first movement of electronic device 100 between two positions and/or orientations.

Second motion data 254 includes second position 254A, second orientation 254B and second movement 254C at a second time. Second position 254A corresponds to a second position/location of electronic device 100. Second orientation 254B corresponds to a second orientation of electronic device 100 relative to the earth. Second movement 254C corresponds to a second movement of electronic device 100 between two positions and/or orientations.

Memory subsystem 120 includes proximity data 260 that is sensed by proximity sensor 159a. Proximity data 260 can be sensed and/or detected by proximity sensor 159a of electronic device 100. Proximity data 260 can indicate that electronic device 100 is close to and/or in the presence of nearby objects. In one example embodiment, proximity data 260 can indicate that electronic device 100 is lying on a table or is in a pocket of a user.

Memory subsystem 120 includes first AoC operating mode 270, second AoC operating mode 272, third AoC operating mode 274, and fourth AoC operating mode 276. In an embodiment, first AoC operating mode 270 corresponds to operating at least one of cameras 152 of the electronic device in an always on mode with a high frequency of image capture rate or frame rate. In one embodiment, the second AoC operating mode 272 corresponds to operating at least one of cameras 152 with a decreased/reduced frequency of image capture to reduce power usage. Third AoC operating mode 274 corresponds to de-activating (i.e., turning off/entering a standby mode) at least one of cameras 152 to reduce power usage. Fourth AoC operating mode 276 corresponds to operating at least one of cameras 152 with an increased frequency of image capture.

Memory subsystem 120 includes first timer 280 and second timer 282. First timer 280 tracks a first time period for monitoring changes in the first image preview 232 and for monitoring changes in the first motion data 252 during the first time period. Second timer 282 tracks a second time period for monitoring changes in the second image preview 234 and for monitoring changes in the second motion data 254 during the second time period.

Memory subsystem 120 includes frequency of image capture 290. Frequency of image capture 290 is the rate at which consecutive images or frames are captured by one or more cameras 152 of electronic device 100. Frequency of image capture 290 can also be referred to as frame rate and can be expressed in frames per second (FPS). Frame rate in a digital camera, such as cameras 152, refers to the maximum possible rate frame that can be captured (e.g. if the exposure time were set to near-zero). In actual practice, other settings (such as exposure time) may reduce the actual frequency of image capture to a lower number than the frame rate. A camera operating at a high frequency of image capture will consume more power than a camera operating at a low frequency of image capture. In one example embodiment, an AoC camera operating at 20 FPS will consume more power than an AoC camera operating at 10 FPS.

Figures 3A, 3B:
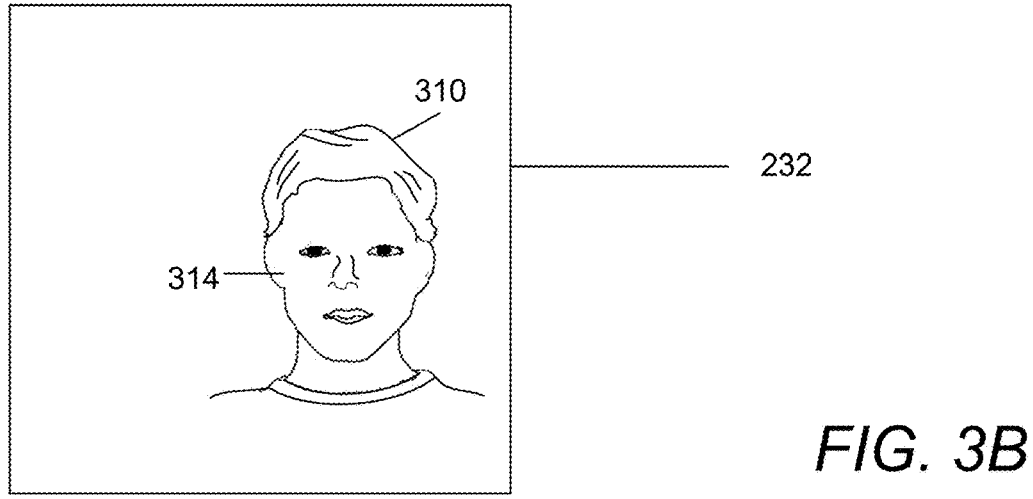
FIG. 3A illustrates an example illustration of an electronic device being held by a user in a first position, having an always on camera (AoC) and operating in a first AoC operating mode, according to one or more embodiments.
FIG. 3B is an example image preview captured by the front camera of the electronic device in the first position of FIG. 3A, according to one or more embodiments.

FIG. 3A illustrates an example of a user 310 holding electronic device 100 in their hand 318 while looking toward front camera 152a1. In FIG. 3A, electronic device 100 is shown in a first position 370. Electronic device 100 includes housing 105 having a front surface 372 and a rear surface 382. Electronic device 100 includes front main camera 152al and front wide angle camera 152a2. In one embodiment, front cameras 152a1 and 152a2 can be partially embedded within front surface 372. Front main camera 152al has a field of view (FOV) 330. In FIG. 3A, the head 312 and face 314 of the user 310 is shown as being within FOV 330. In one embodiment, first image preview 232 can include the head 312 and face 314 of the user 310. In one embodiment, electronic device 100 can operate in an AoC mode and periodically capture an image stream or image preview, such as first image preview 232, using front main camera 152a1. At a later time, front main camera 152al can subsequently capture additional image previews such as second image preview 234.

User 310 can move and/or rotate electronic device 100 using their arm 320 and hand 318 in multiple directions and axes. User 310 can move and/or rotate electronic device 100 along an axis system including an x-axis 360, a y-axis 362, and a z-axis 364. In FIG. 3A, the z-axis 364 is shown as being perpendicular to the ground or earth 366. Motion sensors 157 can sense motion data 250 that corresponds to the position, orientation, and movement of electronic device 100 in each axis (e.g., x-axis 360, y-axis 362, and z-axis 364). Electronic device 100 can determine if the electronic device is being moved or is stationary, based on motion data 250.

With reference now to FIG. 3B, an example first image preview 232 captured by front camera 152a1 with electronic device 100 in first position 370 is illustrated. First image preview 232 includes the face 314 of user 310. In FIG. 3B, first image preview 232 is shown with user 310 off center because the FOV 330 of camera 152a1 in first position 370 is not in a centered alignment with the face of user 310.

Figures 3C, 3D:
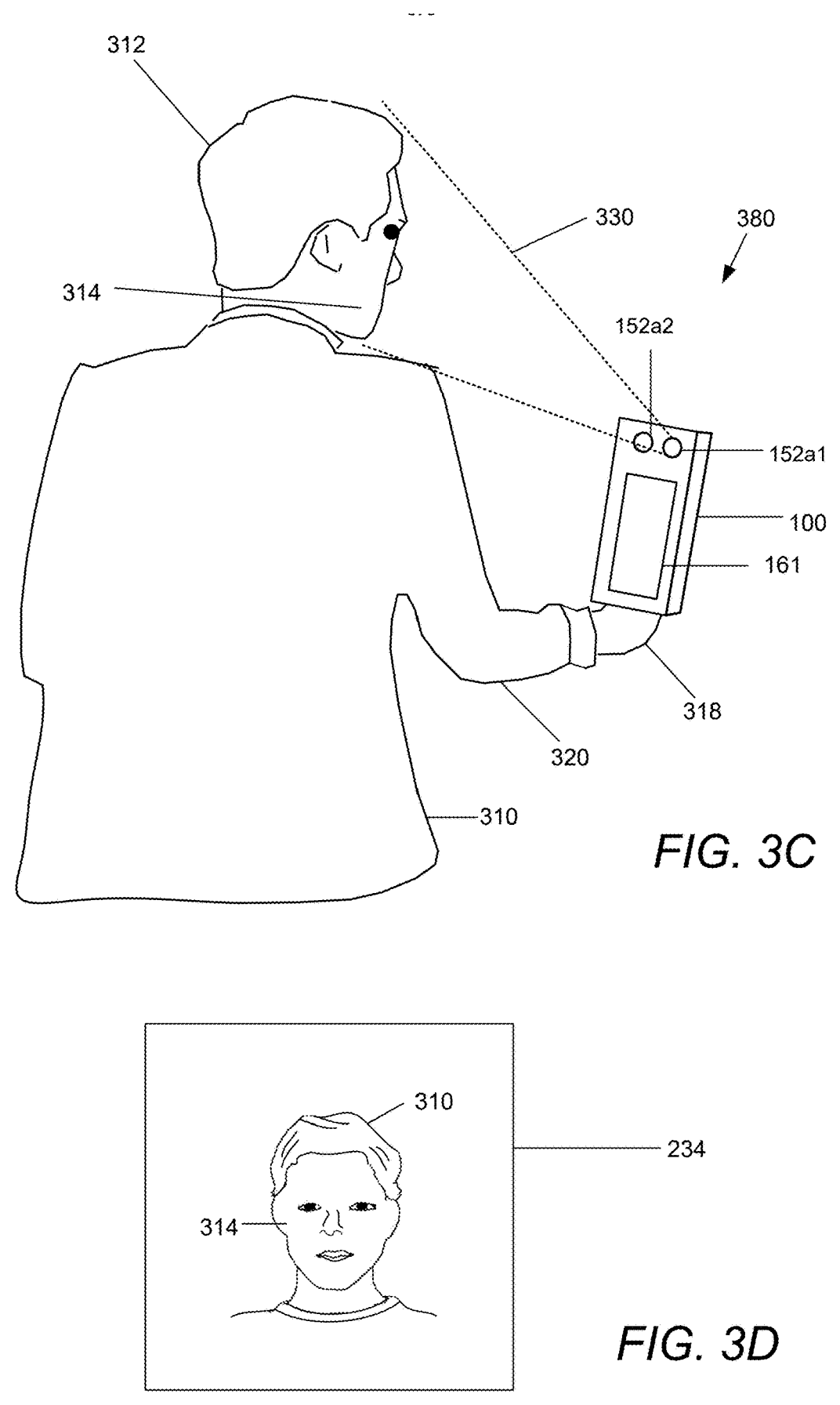

FIG. 3C illustrates another example of a user 310 holding electronic device 100 in their hand 318 while looking toward front camera 152a1. In FIG. 3C, electronic device 100 has been moved from first position 370 to second position 380.

In FIG. 3C, the head 312 and face 314 of the user 310 is shown as being within FOV 330.

With reference now to FIG. 3D, an example second image preview 234 captured by front camera 152a1 with electronic device 100 in second position 380 is illustrated. Second image preview 234 includes the face 314 of user 310. In FIG. 3D, second image preview 234 is shown with user 310 centered in the image because the FOV 330 of camera 152a1 in second position 380 is in a centered alignment with the face of user 310. Second image preview 234 is different than first image preview 232 because electronic device 100 has been moved from first position 370 to second position 380. In another embodiment, electronic device 100 can remain stationary and second image preview 234 is different than first image preview 232 because user 310 has moved to a different position.

According to one aspect of the disclosure, camera activation/de-activation module 125A can enable electronic device 100 to detect activation of a first AoC operating mode 270 of the electronic device. In response to detecting activation of the first AoC operating mode 270, electronic device 100 initiates a first timer 280 tracking a first time period from the detection of the activation of first AoC operating mode 270 of the electronic device and captures a first image preview 232, via at least one camera 152. During the first time period, electronic device 100 monitors, via at least one sensor 157, for movement of the electronic device indicative of a change in at least one of a position (e.g., first position 252A) or an orientation (e.g., first orientation 252B) of the electronic device. In response to expiration of the first time period, without detecting movement of the electronic device, electronic device 100 captures a second image preview 234 using the at least one camera 152 and determines if the second image preview 234 is substantially similar to the first image preview 232. In one embodiment, electronic device 100 compares the second image preview 234 to the first image preview 232 to determine if the second image preview 234 is substantially similar to the first image preview 232. More specifically, electronic device 100 can analyze and compare each pixel in the two images being compared to identify similarities or differences between the two images.

In response to the first image preview 232 being substantially similar to the second image preview 234, electronic device 100 modifies the first AoC operating mode 270 to either one of the second AoC operating mode 272 to reduce the frequency of image capture of the camera or the third AoC operating mode 274 to turn off the camera.

According to another aspect of the disclosure, modifying the first AoC operating mode 270 includes initiating the third AoC operating mode 274 to de-activate the first AoC operating mode 270 and temporarily turn off the at least one camera 152 to reduce power usage.

According to an additional aspect of the disclosure, modifying the first AoC operating mode 270 includes identifying a frequency of image capture 290 of the at least one camera 152 while the electronic device is in the first AoC operating mode 270 and initiating the second AoC operating mode 272 to reduce the frequency of image capture 290 of the at least one camera 152 while the electronic device is in second AoC operating mode 272.

According to one more aspect of the disclosure, in response to the first image preview 232 not being substantially similar to content of the second image preview 234, electronic device 100 stores the second image data (e.g., second image preview 234) and identifies a current frequency of image capture 290 of the at least one camera 152.

Electronic device 100 re-sets the first timer 280 to track a subsequent time period for monitoring device movement before capturing a subsequent image and comparing the captured images. In some embodiments, electronic device 100 initiates the fourth AoC operating mode 276 to increases a frequency of image capture 290 of the at least one camera 152 during the subsequent time period while the electronic device is in the fourth AoC operating mode 276. Electronic device 100 initiates monitoring for movement of the electronic device during the subsequent time period. In some embodiments, the subsequent time period can be a shorter time period than when no movement is detected, as the device has detected movement and the rate of sampling is being increased. Electronic device 100 performs a next comparison of a subsequently captured image preview with the second image preview 234 following expiration of the subsequent time period without detecting movement of the electronic device.

According to still another aspect of the disclosure, in response to detecting, via the at least one sensor 157, movement of the electronic device during the first time period, electronic device 100 resets the first timer 280 to track a next time period and captures a next image preview. Electronic device 100 initiates monitoring for movement by the electronic device during the next time period.

According to an aspect of the disclosure, the at least one sensor 157 comprises at least one of a motion sensor 158a, an accelerometer 158b, a gyroscope 158c, and an inertial measurement unit 158d. According to one more aspect of the disclosure, contemporaneously with turning off the AoC to enter into the third AoC mode 274, electronic device 100 initiates a second timer 282 which tracks a second time period. Electronic device 100 monitors, via the at least one sensor 157, during the second time period, for movement of the electronic device indicative of a change in at least one of a position or an orientation of the electronic device. In response to one of detecting a movement of the electronic device or expiration of the second time period or entry of an AoC activation/re-activation trigger by a user, electronic device 100 re-activates the AoC operating mode (e.g., first AoC operating mode 270) of the electronic device and turns on the at least one camera 152 to provide image capturing during the subsequent AoC operating mode of the electronic device 100.

According to a further aspect of the disclosure, in response to the re-activation of the AoC operating mode (e.g., returning to first AoC operating mode 270) without detecting movement of the electronic device, electronic device 100 reduces a frequency of image capture 290 of the at least one camera 152 while the electronic device is in the newly-activated AoC operating mode (e.g., first AoC operating mode 270).

Figure 4:
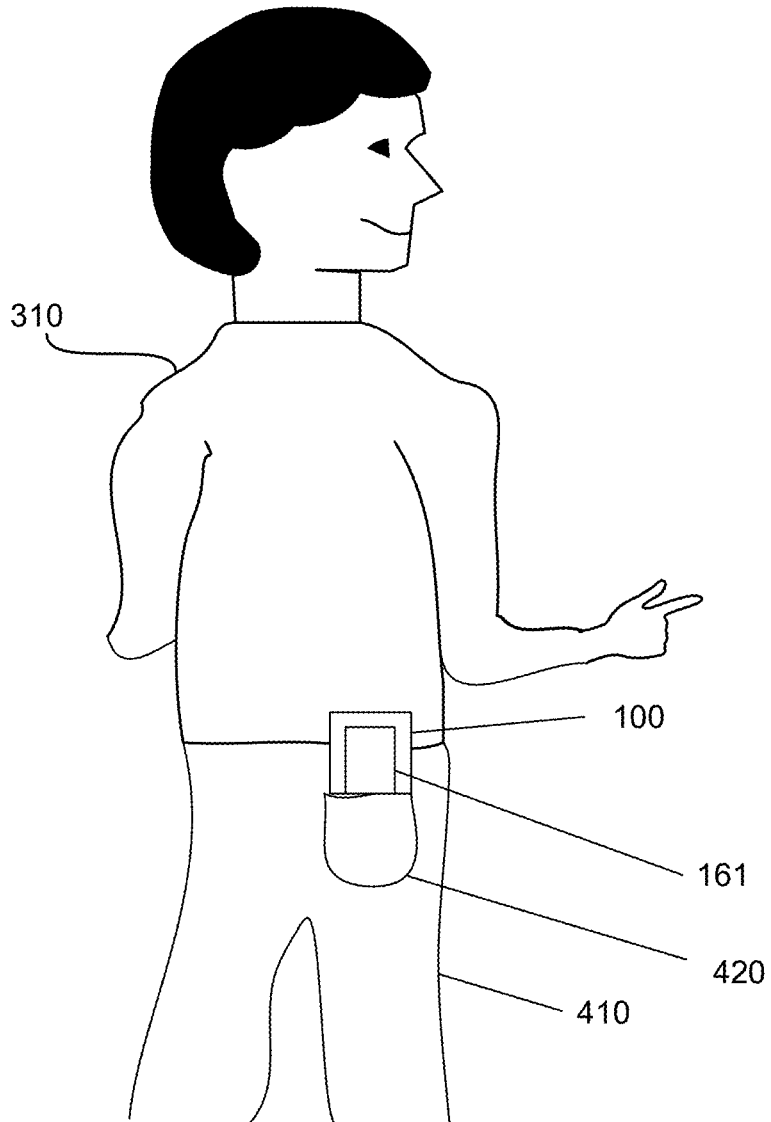
FIG. 4 is an example illustration of the electronic device located in a back pocket of a user, according to one or more embodiments.

FIG. 4 illustrates an example of electronic device 192 located in a pocket of user 310. User 310 is wearing pants 410 that have a pocket 420. Electronic device 100 is located at least partially within pocket 420. In one embodiment, proximity sensor 159a can sense that electronic device 100 is adjacent to or in proximity of an object, such as the user's body inside pants 410, and provide proximity data 260 indicating that electronic device 100 is close to and/or in the presence of nearby objects, such that camera may not be able to take a useable image. In one example embodiment, proximity data 260 can indicate that electronic device 100 is lying on a table or is in a pocket of a user and the FOV 330 of the AoC is blocked.

In another example embodiment, electronic device 100 can determine that the FOV 330 of at least one camera 152 is blocked and turn off the at least one camera 152 (e.g., change the AoC operating mode to third AoC operating mode 274) to reduce power consumption. In an additional example embodiment, a user can preset electronic device 100 to determine that certain positions (e.g., in a pocket) correlate to a condition for turning off the AoC.

According to one aspect of the disclosure, electronic device 100 receives proximity data 260 from proximity sensor 159a and determines if the proximity data 260 indicates that the electronic device is in an on-body location (e.g., inside pocket 420) where the electronic device is not likely being used. In response to determining from the proximity data 260 that the electronic device is in the on-body location where the electronic device is not likely being used based on a pre-programmed setting or historical data, electronic device 100 de-activates the first AoC operating mode 270 and turns off the at least one camera 152.

According to an additional aspect of the disclosure, electronic device 100 receives proximity data 260 from proximity sensor 159a and determines if the proximity data 260 indicates that the electronic device is placed in a position from which the electronic device is not likely being used. In response to determining from the proximity data 260 that the electronic device is not likely being used, electronic device 100 de-activates the first AoC operating mode 270 and temporarily turns off the at least one camera 152 (i.e., enters into the third AoC operating mode 274).

Figure 5:
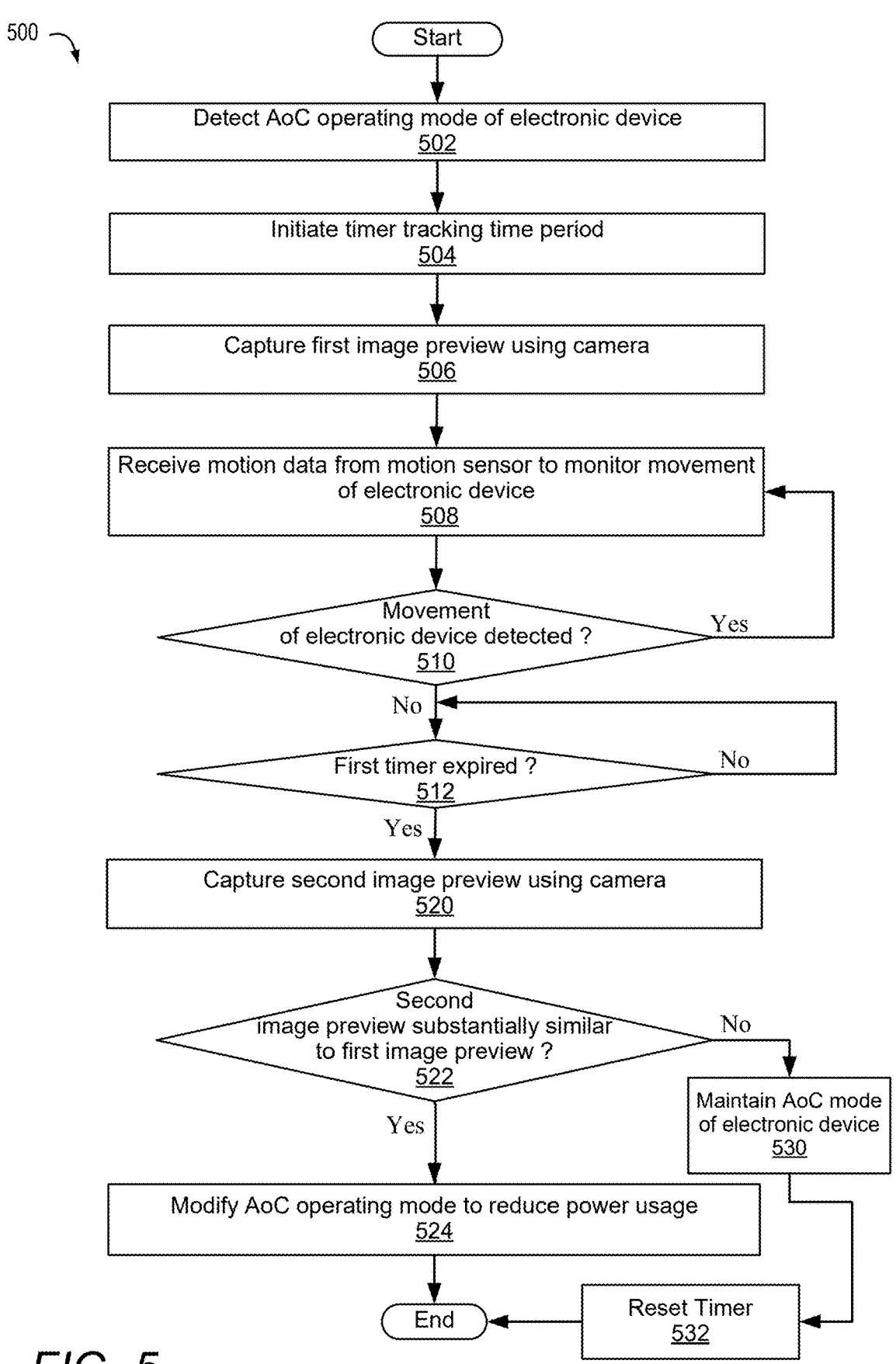
FIG. 5 depicts a flowchart of a method by which an electronic device modifies an operating mode of an AoC to reduce power usage, according to one or more embodiments.

FIG. 5 depicts method 500 by which electronic device 100 modifies an operating mode of an AoC to reduce power usage. FIG. 6 depicts method 600 by which electronic device 100 modifies a frequency of image capture by an AoC based on an amount of detected movement of the electronic device or changes in captured images during a sampling interval.

The description of methods 500 and 600 will be described with reference to the components and examples of FIGS. 1-4. The operations depicted in FIGS. 5 and 6 can be performed by electronic device 100 or any suitable electronic device that includes the one or more functional components of electronic device 100 that provide/enable the described features. One or more of the processes of the methods described in FIGS. 5 and 6 may be performed by processor 112 executing program code associated with camera activation/de-activation module 125A and AoC module 125B.

With specific reference to FIG. 5, method 500 begins at the start block. At block 502, method 500 includes detecting activation of first AoC operating mode 270 of the electronic device. In response to detecting the activation of first AoC operating mode 270, method 500 includes initiating first timer 280 tracking a first time period from the detection of the first AoC operating mode 270 of the electronic device (block 504). Method 500 includes capturing a first image preview 232, via at least one camera 152 (block 506). Method 500 includes monitoring, via at least one motion sensor 157 during the first time period, for movement of the electronic device indicative of a change in at least one of a position (e.g., first position 252A) or an orientation (e.g., first orientation 252B) of the electronic device (block 508). Method 500 includes determining whether movement of the electronic device has been detected (i.e., whether first motion data 252 has been received from the at least one motion sensor 157 indicative of substantial movement of the electronic device (decision block 510). In one embodiment, small or minor movements of the electronic device are not determined to be motion of the electronic device as the minor movements of the electronic device are not likely to provide a significant change in the FOV of the camera.

In response to not detecting movement of the device (e.g., not receiving any significant/substantive first motion data), method 500 includes determining if the first timer tracking the first time period has expired (decision block 512). In response to determining the first timer tracking the first time period has not expired, method 500 continues to monitor for device movement (block 508) and tracking whether device movement is detected (decision block 510) or the first time period has expired (decision block 512). In response to detecting movement of the device (e.g., receiving significant/substantive first motion data), method 500 continues to monitor for device movement (block 508) and track whether device movement is detected (decision block 510). In response to determining the first timer 280 tracking the first time period has not expired, method 500 continues to monitor for expiration of the first timer 280 (decision block 512). In response to determining the first timer 280 tracking the first time period has expired, method 500 includes capturing second image preview 234, via at least one camera 152 (block 520).

At decision block 522, method 500 includes determining if the second image preview 234 is substantially similar to the first image preview 232. In response to the second image preview 234 being substantially similar to the first image preview 232, method 500 includes modifying the first AoC operating mode 270 to a third AoC operating mode 274 to reduce power usage by de-activating (i.e., turning off) the at least one camera 152 (block 524). The third AoC operating mode 274 can include temporarily turning off the at least one camera 152. In one embodiment, after the at least one camera 152, has been turned off, a next timer can be set to track a time period before turning the camera back on. It is appreciated that prior to expiration of the next time period, the camera can be automatically turned back on in response to detection of subsequent movement of the electronic device or receipt of a manual/virtual trigger to re-activate the first AoC operating mode 270. Method 500 terminates at the end block. In response to the second image preview 234 not being substantially similar to the first image preview 232, method 500 includes maintaining the current AoC operating mode (e.g., first AoC operating mode 270) of the at least one camera 152 (block 530) and resetting the first timer 280 (block 532). Method 500 ends at the end block.

Figure 6:
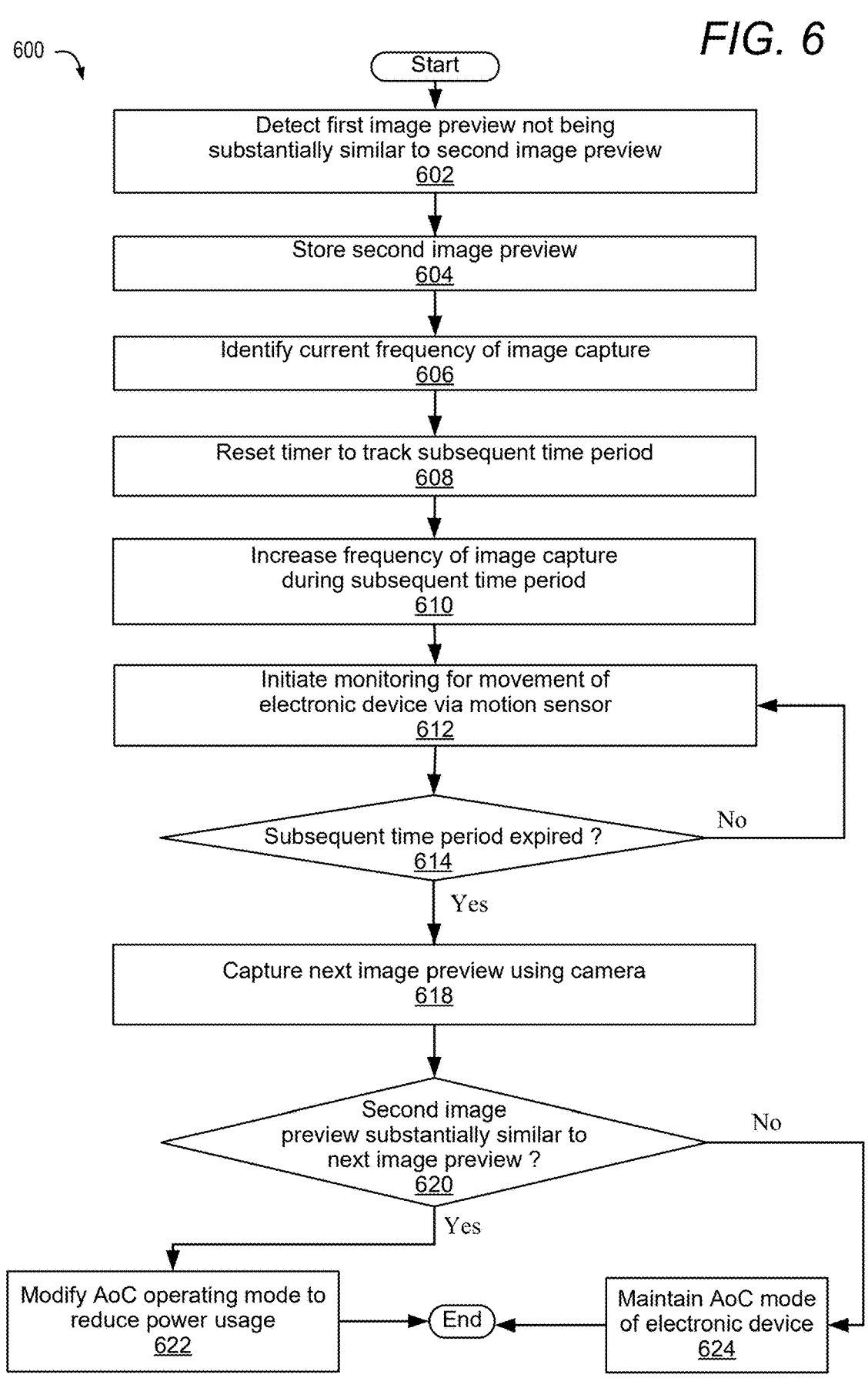
FIG. 6 depicts a flowchart of a method by which an electronic device modifies a frequency of image capture by an AoC based on an amount of detected movement of the electronic device or detected changes in captured images during a sampling interval, according to one or more embodiments.

FIG. 6 illustrates method 600 by which electronic device 100 modifies a frequency of image capture by an AoC based on an amount of detected movement of the electronic device or changes in captured images during a sampling interval. Method 600 begins at the start block. At block 602, method 600 includes detecting that the content within first image preview 232 is not substantially similar to content of the second image preview 234. In response to detecting the content of first image preview 232 not being substantially similar to content of the second image preview 234, method 600 includes storing the second image data (e.g., second image preview 234) (block 604) and identifying a current frequency of image capture 290 of the at least one camera 152 (block 606).

Method 600 includes re-setting the first timer 280 to track a subsequent time period for monitoring device movement and before comparing captured images (block 608). Method 600 includes increasing a frequency of image capture 290 of the at least one camera 152 (i.e., initiating fourth AoC operating mode 276) during the subsequent time period while the electronic device remains in the AoC mode (block 610). Method 600 includes initiating monitoring for movement of the electronic device, via the motion sensor during the subsequent time period (block 612).

Method 600 includes determining if the subsequent time period has expired (decision block 614). In response to determining that the subsequent time period has not expired, method 600 continues to monitor for movement of the electronic device, via the motion sensor during the subsequent time period (block 612). In response to determining that the subsequent time period has expired without detecting movement of the electronic device, method 600 includes capturing a next image preview (block 618) and determining if the second image preview 234 is substantially similar to the next image preview (decision block 620).

In response to the second image preview 234 being substantially similar to the next image preview, method 600 includes modifying the first AoC operating mode 270 to a second AoC operating mode 272 to reduce power usage by the at least one camera 152 (block 622). The second AoC operating mode 272 can include reducing a frequency of image capture 290. Method 600 terminates at the end block. In response to the second image preview 234 not being substantially similar to the next image preview, method 600 includes maintaining the current AoC operating mode of the at least one camera 152 (block 624).

In an embodiment, the frequency of image capture 290 can be increased in response to the second image preview 234 not being substantially similar to the next image preview. In one embodiment, the frequency of image capture 290 can include three levels of the frequency of image capture, a standard frequency of image capture, a lower frequency of image capture and a higher frequency of image capture. Electronic device 100 can adjust the frequency of image capture based on changes in the image preview. In other embodiments, the frequency of image capture can extend across a range of frequencies, and the electronic device can granularly increase or decrease the frequency within this range based on the detected changes in the images being captured or movement of the electronic device. Method 600 ends at the end block.

The disclosure provides improvements in the use of AoC technology within electronic device by enabling an AoC of an electronic device to be de-activated when images captured by the AoC do not change of a measured time period, thus saving power consumption. Additional benefits include enabling an AoC of an electronic device to be de-activated when the electronic device is stationary (i.e., movement of the electronic device is not detected). Further, the disclosure enables an AoC of an electronic device to autonomously reduce a frequency of image capture, which also reduces power consumption of the AoC, when changes in the captured images are not being recorded by the AoC. Accordingly the disclosure provides an enhancement to an electronic device capable of operating in AoC mode by reducing power consumption and thus increasing battery life while operating in the enhanced/hybrid AoC mode.

In the above-described methods of FIGS. 5 and 6, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined primarily by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. An electronic device comprising:
at least one camera utilized to support always-on-camera (AoC) functionality of the electronic device;
at least one sensor that detects movement of the electronic device;
a memory having stored thereon an AoC module and a camera activation/de-activation module for activating and de-activating the at least one camera; and
at least one processor communicatively coupled to each of the at least one camera, the at least one sensor, and the memory, and which executes program code of the AoC module and the camera activation/de-activation module, the at least one processor configured to cause the electronic device to:
in response to detecting an AoC operating mode of the electronic device:
initiate a first timer tracking a first time period from the detection of the AoC operating mode of the electronic device;
capture a first image preview via the at least one camera;
monitor, via the at least one sensor during the first time period, for movement of the electronic device indicative of a change in at least one of a position or an orientation of the electronic device; and
in response to expiration of the first time period, without detecting movement of the electronic device:
capture a second image preview using the at least one camera;
determine if the second image preview is substantially similar to the first image preview; and
in response to the first image preview being substantially similar to the second image preview, modify the AoC operating mode to reduce power usage by the at least one camera.

2. The electronic device of claim 1, wherein in modifying the AoC operating mode, the at least one processor is configured to cause the electronic device to de-activate the AoC operating mode and turn off the at least one camera.

3. The electronic device of claim 1, wherein in modifying the AoC operating mode, the at least one processor is configured to cause the electronic device to:

identify a frequency of image capture of the at least one camera while the device is in the AoC operating mode; and reduce the frequency of image capture of the at least one camera while the electronic device is in the AoC mode.

4. The electronic device of claim 1, wherein the at least one processor is further configured to cause the electronic device to:

in response to the first image preview not being substantially similar to content of the second image preview:

store the second image preview;

identify a current frequency of image capture of the at least one camera;

re-set the first timer to track a subsequent time period for monitoring device movement and before comparing captured images;

increase a frequency of image capture of the at least one camera during the subsequent time period while the electronic device is in the AoC mode;

initiate monitoring for movement of the electronic device during the subsequent time period; and perform a next comparison of a subsequently captured image preview with the second image preview on expiration of the subsequent time period without detecting movement of the electronic device.

5. The electronic device of claim 1, wherein the at least one processor is further configured to cause the electronic device to:

in response to detecting, via the at least one sensor, movement of the electronic device during the first time period:

reset the first timer to track a next time period;

capture a next image preview; and initiate monitoring for movement by the electronic device during the next time period.

6. The electronic device of claim 1, wherein the at least one sensor comprises at least one of a motion sensor, an inertial measurement unit, a gyroscope, and an accelerometer.

7. The electronic device of claim 1, wherein the at least one processor is further configured to cause the electronic device to:

initiate a second timer which tracks a second time period;

monitor, via the at least one sensor during the second time period, for movement of the electronic device indicative of a change in at least one of a position or an orientation of the electronic device; and in response to one of detecting a movement of the electronic device, or expiration of the second time period, or entry of an AoC activation trigger by a user, re-activate the AoC operating mode of the electronic device and turn on the at least one camera to provide image capturing during the AoC operating mode of the electronic device.

8. The electronic device of claim 7, wherein the at least one processor is further configured to cause the electronic device to:

in response to the re-activation of the AoC operating mode without detecting movement of the electronic device, reduce a frequency of image capture of the at least one camera while the electronic device is in the AoC mode.

9. The electronic device of claim 1, further comprising:

at least one proximity sensor that is communicatively coupled to the at least one processor, and wherein, the at least one processor is further configured to cause the electronic device to:

receive first proximity data from the at least one proximity sensor;

determine if the first proximity data indicates that the electronic device is in an on-body location where the electronic device is not likely being used; and in response to determining from the first proximity data that the electronic device is in the on-body location where the electronic device is not likely being used, de-activate the AoC mode and turn off the at least one camera.

10. The electronic device of claim 1, further comprising:

at least one position sensor that is communicatively coupled to the at least one processor, and wherein, the at least one processor is further configured to cause the electronic device to:

receive first position data from the at least one position sensor;

determine if the first position data indicates that the electronic device is placed in a position from which the electronic device is not likely being used; and in response to determining from the first position data that the electronic device is not likely being used, de-activate the AoC mode and turn off the at least one camera.

11. A method comprising:

in response to an detecting an always on camera (AoC) operating mode of an electronic device:

initiating, via at least one processor, a first timer tracking a first time period from the detection of the AoC operating mode of the electronic device;

capturing a first image preview via at least one camera;

monitoring, via at least one sensor during the first time period, for movement of the electronic device indicative of a change in at least one of a position or an orientation of the electronic device; and in response to expiration of the first time period, without detecting movement of the electronic device:

capturing a second image preview using the at least one camera;

determining if the second image preview is substantially similar to the first image preview; and in response to the first image preview being substantially similar to the second image preview, modifying the AoC operating mode to reduce power usage by the at least one camera.

12. The method of claim 11, wherein modifying the AoC operating mode comprises:

temporarily de-activating the AoC operating mode and turning off the at least one camera;

initiating a second timer to track a second time period;

monitoring, via the at least one sensor during the second time period, for movement of the electronic device indicative of a change in at least one of a position or an orientation of the electronic device;

in response to detecting one of a movement of the electronic device prior to expiration of the second time period or entry of an AoC activation trigger by a user, re-activating the AoC operating mode of the electronic device and turning on the at least one camera to provide image capturing during the AoC operating mode of the electronic device during a third time period; and in response to the re-activation of the AoC operating mode, reducing a frequency of image capture of the at least one camera while the electronic device is in the AoC mode during the third time period.

13. The method of claim 11, wherein modifying the AoC operating mode comprises:

identifying a frequency of image capture of the at least one camera while the device is in the AoC operating mode; and reducing the frequency of image capture of the at least one camera while the electronic device is in the AoC mode.

14. The method of claim 11, further comprising:

in response to the first image preview not being substantially similar to content of the second image preview:

storing the second image preview;

identifying a current frequency of image capture of the at least one camera;

re-setting the first timer to track a subsequent time period for monitoring device movement and before comparing captured images;

increasing a frequency of image capture of the at least one camera during the subsequent time period while the electronic device is in the AoC mode;

initiating monitoring for movement of the electronic device during the subsequent time period; and performing a next comparison of a subsequently captured image preview with the second image preview on expiration of the subsequent time period without detecting movement of the electronic device.

15. The method of claim 11, further comprising:

in response to detecting, via the at least one sensor, movement of the electronic device during the first time period:

resetting the first timer to track a next time period;

capturing a next image preview; and initiating monitoring for movement by the electronic device during the next time period.

16. The method of claim 11, further comprising:

receiving first proximity data from at least one proximity sensor;

determining if the first proximity data indicates that the electronic device is in an on-body location where the electronic device is not likely being used; and in response to determining from the first proximity data that the electronic device is in the on-body location where the electronic device is not likely being used, de-activating the AoC mode and turning off the at least one camera.

17. The method of claim 11, further comprising:

receiving first position data from at least one position sensor;

determining if the first position data indicates that the electronic device is placed in a position from which the electronic device is not likely being used; and in response to determining from the first position data that the electronic device is not likely being used, de-activating the AoC mode and turning off the at least one camera.

18. A computer program product comprising:

a computer readable storage device having stored thereon program code which, when executed by at least one processor of an electronic device having at least one camera and at least one sensor, configures the electronic device to complete the functionality of:

in response to an detecting an always on camera (AoC) operating mode of the electronic device:

initiating a first timer tracking a first time period from the detection of the AoC operating mode of the electronic device;

capturing a first image preview via the at least one camera;

monitoring, via the at least one sensor during the first time period, for movement of the electronic device indicative of a change in at least one of a position or an orientation of the electronic device; and in response to expiration of the first time period, without detecting movement of the electronic device:

capturing a second image preview using the at least one camera;

determining if the second image preview is substantially similar to the first image preview; and in response to the first image preview being substantially similar to the second image preview, de-activating the AoC operating mode and turning off the at least one camera.

19. The computer program product of claim 18, wherein to modify the AoC operating mode the program code further configures the electronic device to complete the functionality of:

temporarily de-activating the AoC operating mode and turning off the at least one camera;

initiating a second timer to track a second time period;

monitoring, via the at least one sensor during the second time period, for movement of the electronic device indicative of a change in at least one of a position or an orientation of the electronic device;

in response to detecting one of a movement of the electronic device prior to expiration of the second time period or entry of an AoC activation trigger by a user, re-activating the AoC operating mode of the electronic device and turning on the at least one camera to provide image capturing during the AoC operating mode of the electronic device during a third time period; and in response to the re-activation of the AoC operating mode, reducing a frequency of image capture of the at least one camera while the electronic device is in the AoC mode during the third time period.

20. The computer program product of claim 18, wherein the program code further configures the electronic device to complete the functionality of:

in response to the first image preview not being substantially similar to content of the second image preview:

storing the second image preview;

identifying a current frequency of image capture of the at least one camera;

re-setting the first timer to track a subsequent time period for monitoring device movement and before comparing captured images;

increasing a frequency of image capture of the at least one camera during the subsequent time period while the electronic device is in the AoC mode;

initiating monitoring for movement of the electronic device during the subsequent time period; and performing a next comparison of a subsequently captured image preview with the second image preview on expiration of the subsequent time period without detecting movement of the electronic device.

\* \* \* \* \*